United States Patent
Oda et al.

(10) Patent No.: US 11,932,483 B2
(45) Date of Patent: Mar. 19, 2024

(54) ARTICLE CONVEYING APPARATUS

(71) Applicant: Ishida Co., Ltd., Kyoto (JP)

(72) Inventors: Kazuteru Oda, Ritto (JP); Toshiharu Kageyama, Ritto (JP); Shinichi Miyamoto, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 82 days.

(21) Appl. No.: 17/508,963

(22) Filed: Oct. 22, 2021

(65) Prior Publication Data

US 2022/0144539 A1    May 12, 2022

(30) Foreign Application Priority Data

Nov. 6, 2020 (JP) ................................. 2020-185848

(51) Int. Cl.
*B65D 88/28* (2006.01)
*B65B 1/32* (2006.01)
*B65B 37/18* (2006.01)
*B65D 88/32* (2006.01)

(52) U.S. Cl.
CPC ............... *B65D 88/28* (2013.01); *B65B 1/32* (2013.01); *B65B 37/18* (2013.01); *B65D 88/32* (2013.01)

(58) Field of Classification Search
CPC ...... G01G 21/28; G01G 19/393; B65D 88/28; B65D 88/32
See application file for complete search history.

(56) References Cited

U.S. PATENT DOCUMENTS

| 5,101,954 | A | 4/1992 | Nambu |
| 6,188,029 | B1 | 2/2001 | Miyamoto et al. |
| 6,703,568 | B2* | 3/2004 | Wako .................. G01G 19/393 177/180 |

(Continued)

FOREIGN PATENT DOCUMENTS

| CN | 110092159 A | 8/2019 |
| EP | 0852328 A1 | 7/1998 |

(Continued)

OTHER PUBLICATIONS

The extended European search report issued by the European Patent Office dated Apr. 4, 2022, which corresponds to European Patent Application No. 21204289.9-1001 and is related to U.S. Appl. No. 17/508,963.

(Continued)

*Primary Examiner* — Timothy P. Kelly
(74) *Attorney, Agent, or Firm* — Studebaker & Brackett PC

(57) ABSTRACT

An article conveying apparatus (1) according to an embodiment includes: a hopper (60/70) that temporarily stores an article charged from an outside and discharges the article downstream; a driver (10) that dives the hopper; and a main body (100) to be attached with the driver, wherein the main body includes: a top plate (110) that has a plane in a horizontal direction; and a side surface (120) to be attached with the driver, and the side surface has: a first surface (120A) that stands up in a vertical direction and is to be connected to the top plate; and a second surface (120B) that is formed continuously with the first surface, is attached with the driver, and is inclined in a direction of going toward a center axis (0) of the main body as going downward in the vertical direction.

5 Claims, 5 Drawing Sheets

(56) References Cited

U.S. PATENT DOCUMENTS

| 9,234,787 B2* | 1/2016 | Nagai | G01G 19/393 |
| 2016/0362241 A1* | 12/2016 | Morimoto | G01G 13/003 |

FOREIGN PATENT DOCUMENTS

| EP | 1228988 B1 | 5/2011 |
| JP | H08-26449 A | 1/1996 |
| JP | 3670295 B2 | 7/2005 |

OTHER PUBLICATIONS

An Office Action mailed by the Indian Patent Office dated Aug. 29, 2022, which corresponds to Indian Patent Application 202114050425 and is related to U.S. Appl. No. 17/508,963.

* cited by examiner

ARTICLE CONVEYING APPARATUS

CROSS-REFERENCE TO RELATED APPLICATION

This application is based upon and claims the benefit of priority from Japanese Patent Application No. 2020-185848 filed on Nov. 6, 2020 in Japan, the entire contents of which are incorporated herein by reference.

TECHNICAL FIELD

The present invention relates to an article conveying apparatus.

BACKGROUND ART

In general, in a combination weighing apparatus, a main body to be attached with drivers which drive hoppers has: a top plate having a plane in the horizontal direction; and a side surface to be attached with such drivers.

For example, there is one having a side surface that is inclined continuously in a direction of going toward a center axis of a main body as going downward in the vertical direction, in which the side surface is connected to a top plate (for example, see Japanese Patent No. 3670295).

SUMMARY OF THE INVENTION

Technical Problem

In general, in the combination weighing apparatus, it is assumed that such a top plate portion and the side surface are joined to each other by welding. Hence, when the side surface and the top plate, which are mentioned above, are joined to each other in a state of not being vertically overlapped on each other as mentioned above, there has been a problem that difficulty in machining thereof occurs to increase manufacturing cost. Moreover, there has been a problem that the welding is prone to cause a thermal distortion to decrease machining accuracy.

In this connection, the present invention has been made in view of the above-described problems, and it is an object of the present invention to provide an article conveying apparatus that makes it easy to join the top plate portion and the side surface to each other, and makes it possible to prevent the decrease of the machining accuracy due to the joining.

Solution to Problem

An article conveying apparatus according to one embodiment is summarizes as including: a hopper that temporarily stores an article charged from an outside and discharges the article downstream; a driver that dives the hopper; and a main body to be attached with the driver, wherein the main body includes: a top plate that has a plane in a horizontal direction; and a side surface to be attached with the driver, and the side surface has: a first surface that stands up in a vertical direction and is to be connected to the top plate; and a second surface that is formed continuously with the first surface, is attached with the driver, and is inclined in a direction of going toward a center axis of the main body as going downward in the vertical direction.

Advantageous Effects of Invention

According to the present invention, it is possible to provide an article conveying apparatus that makes it easy to join the top plate portion and the side surface to each other, and makes it possible to prevent the decrease of the machining accuracy due to the joining.

DESCRIPTION OF EMBODIMENTS

Figure 1:
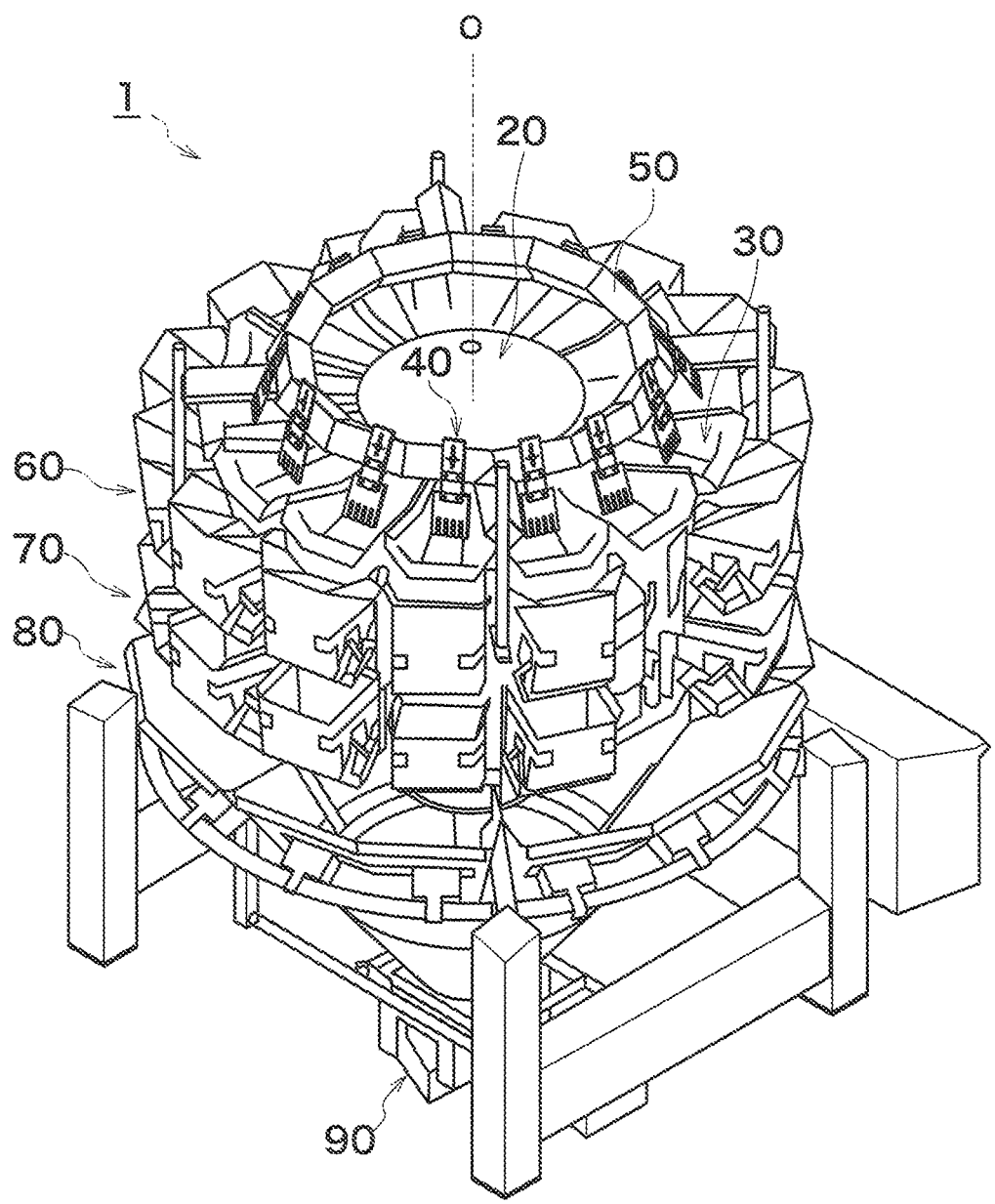
FIG. 1 is a perspective view illustrating an example of a whole of a combination weighing apparatus according to an embodiment.

Hereinafter, the present embodiment will be described in detail with reference to the attached drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings. In this specification and the drawings, elements having substantially the same function and configuration are denoted by the same reference numerals to omit redundant description, and elements not directly related to the present invention are omitted.

First Embodiment

Referring to FIGS. 1 to 5, a description will be given below of a combination weighing apparatus 1 as an example of an article conveying apparatus including a conveying unit in a first embodiment of the present invention.

Specifically, in the present embodiment, as an example, the combination weighing apparatus 1 will be described, which is configured as illustrated in FIG. 1 to receive and aggregate articles by a circular chute 80. Herein, the articles are discharged from a plurality of hoppers 60 and 70 arranged circularly.

As illustrated in FIG. 1, the combination weighing apparatus 1 according to the present embodiment includes a dispersion table 20, radiation feeders 30, flow rate regulators 40, supports 50, pool hoppers 60, weighing hoppers 70, the chute 80, and a timing hopper 90.

The dispersion table 20 may be configured to, while dispersing the articles charged from the outside, supply the articles to a plurality of the radiation feeders 30 arranged around the dispersion table 20.

Each of the plurality of radiation feeders 30 is configured to convey the article, which is supplied from the dispersion table 20, to the pool hopper 60 provided to correspond to each radiation feeder 30.

In the present embodiment, the dispersion table 20, the pool hoppers 60, the weighing hoppers 70, the plurality of radiation feeders 30, the chute 80 and the timing hopper 90 correspond to a conveying unit that receives the charged articles by a conveying surface thereof and conveys the received articles downstream. Although not illustrated in the present embodiment, when booster hoppers are arranged downstream of the weighing hoppers 70 and upstream of the chute 80, the booster hoppers also correspond to the conveying unit.

Moreover, each radiation feeder 30 has a conveying path that conveys the article, and the flow rate regulator 40 is arranged on such a conveying path. The flow rate regulator 40 is configured to regulate a flow rate of the article to be conveyed to the pool hopper 60. Each of the supports 50 is configured to support the flow rate regulator 40.

Each of the pool hoppers 60 is configured to deliver the article, which is supplied from each radiation feeder 30, to the weighing hopper 70 disposed below each pool hopper 60.

Each weighing hopper 70 is configured to acquire a weight value of the article delivered from each pool hopper 60 and temporarily retained therein.

Herein, a control unit (not shown) is configured to select, from among combinations of the weight values acquired by the respective weighing hoppers, a combination that becomes the closest to a target value within a predetermined allowable range, and to discharge the articles, which are temporarily retained therein, from the weighing hoppers 70 corresponding to such a combination to the chute 80 disposed below such weighing hoppers 70.

The chute 80 is configured to supply, to the timing hopper 90, the article discharged from each weighing hopper 70.

The timing hopper 90 is configured to supply the article, which is supplied by the chute, to a bag-making packing machine or the like which is placed on a subsequent stage to such a conveying apparatus 1.

In the present embodiment, a case will be described, in which the pool hoppers 60 correspond to first hoppers which temporarily store the articles charged from the outside and thereafter discharge such articles downstream, and the weighing hoppers 70 correspond to second hoppers which temporarily store the articles discharged from the pool hoppers 60 and thereafter discharge such articles downstream. However, the present invention is not limited to such a case.

Figure 2:
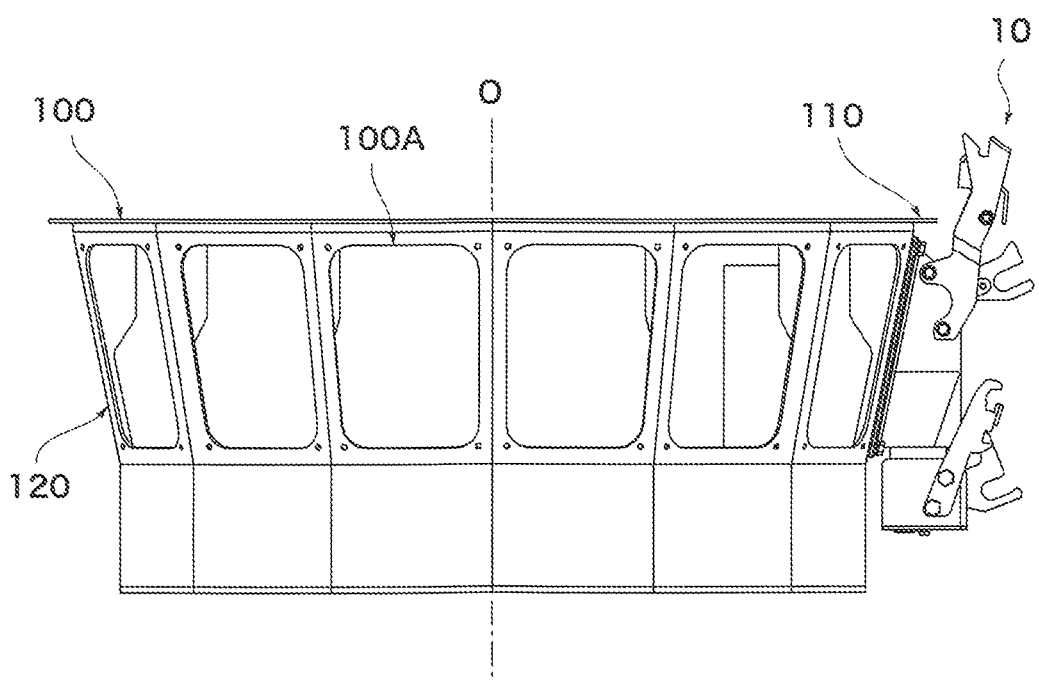
FIG. 2 is a view for explaining an example of a structure of a main body of the combination weighing apparatus according to the embodiment.
Figure 3:
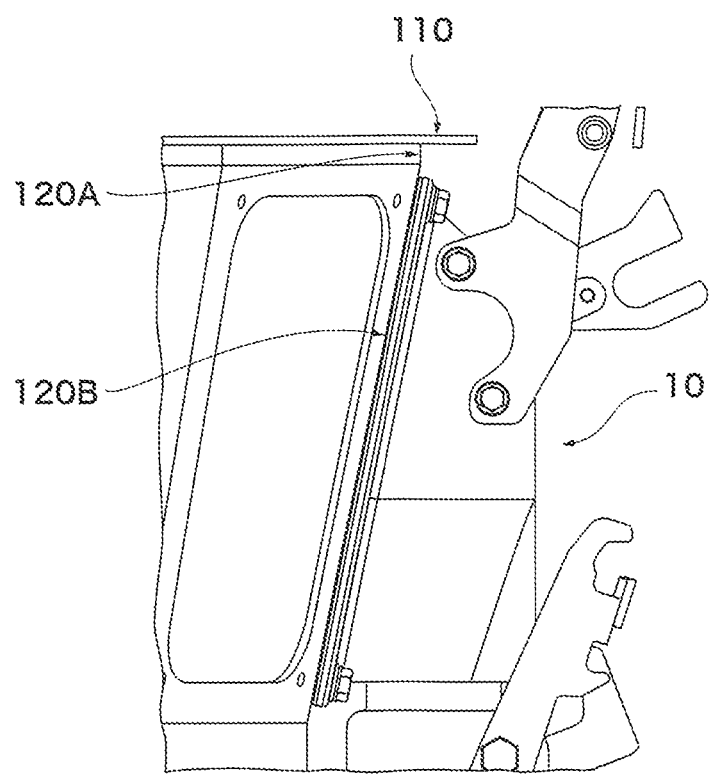
FIG. 3 is a view for explaining the example of the structure of the main body of the combination weighing apparatus according to the embodiment.

Moreover, as illustrated in FIGS. 2 and 3, the combination weighing apparatus 1 according to the present embodiment further includes: a driver 10 that drives the pool hoppers 60 and the weighing hoppers 70; and a main body 100 to be attached with the driver 10.

Herein, as illustrated in FIGS. 2 and 3, the main body 100 includes: a top plate 110 having a plane in the horizontal direction; and a side surface 120 to be attached with the driver 10.

Figure 4:
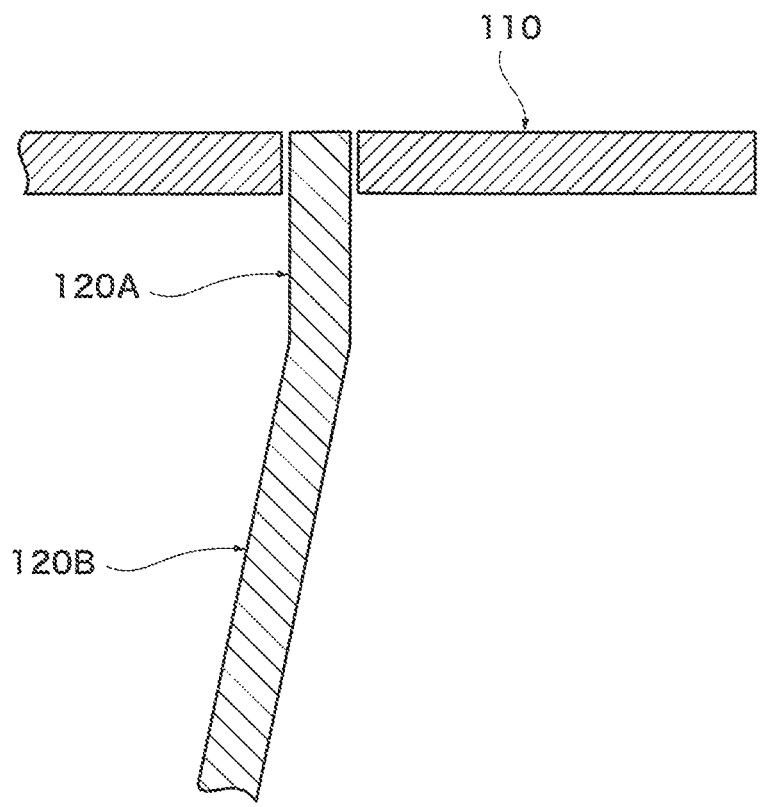
FIG. 4 is a view for explaining the example of the structure of the main body of the combination weighing apparatus according to the embodiment.

Moreover, as illustrated in FIGS. 3 and 4, the side surface 120 has a first surface 120A and a second surface 120B.

Herein, as illustrated in FIGS. 3 and 4, the first surface 120A stands up in the vertical direction, and is connected to the top plate 110.

Meanwhile, as illustrated in FIGS. 3 and 4, the second surface 120B is connected continuously with the first surface 120A, is attached with the driver 10, and is inclined in a direction of going toward a center axis O (see FIG. 1) of the main body as going downward in the vertical direction.

As described above, the second surface 120B is inclined as going downward in the vertical direction, and accordingly, adhered matter to the second surface 120B slides down or falls down along the second surface 120B. Therefore, hygiene in the combination weighing apparatus 1 can be improved. Moreover, the second surface 120B is inclined as described above, whereby an attaching surface of the driver 10 can also be inclined. Therefore, an upper surface of the driver 10 can also be inclined in conjunction, and the article retained on this upper surface can be reduced.

Moreover, as illustrated in FIG. 2, openings 100A are formed in the second surface 120B. The driver 10 is configured to be inserted into each of the openings 100A in a direction of going inward from the outside of the main body 100 and to be attached to the main body 100.

With such a configuration, as illustrated in FIG. 4, (1) while improving the hygiene on the second surface 120B, and (2) in a state where the top plate 110 and the first surface 120A are vertical, both of the top plate 110 and the first surface 120A can be welded to each other to facilitate machining thereof, and cost can be reduced. Further, machining accuracy can also be improved.

Figure 5:
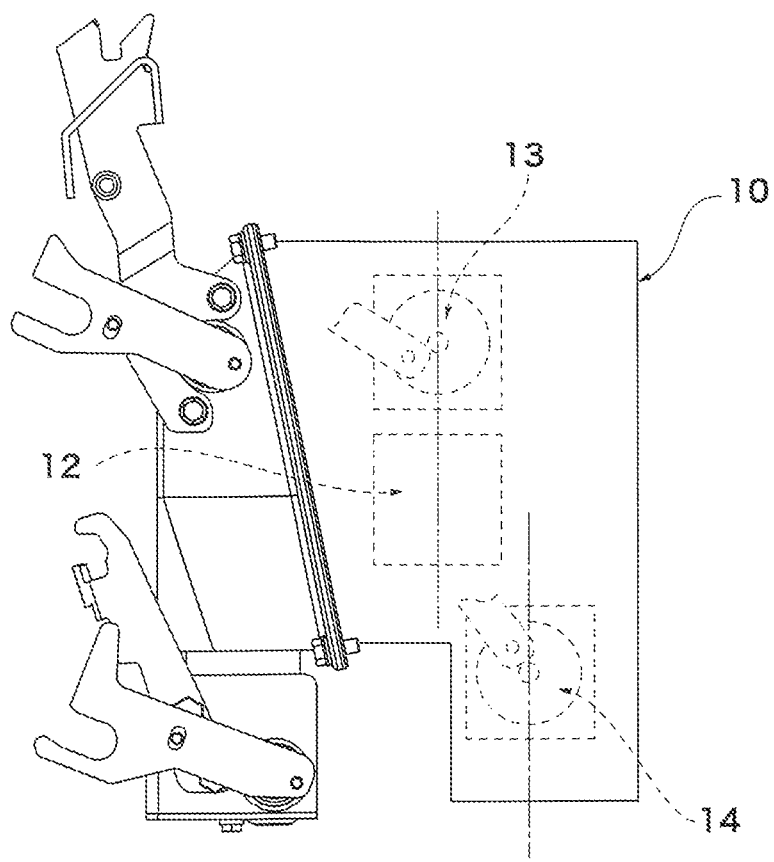
FIG. 5 is a view for explaining an example of a structure of a driver of the combination weighing apparatus according to the embodiment.

As illustrated in FIG. 5, the driver 10 includes: a first motor 14 that drives the pool hopper 60; a second motor 13 that drives the weighing hopper 70; and a load cell 12 that senses the weight of the article stored in the weighing hopper 70.

Herein, as illustrated in FIG. 5, the first motor 14, the second motor 13 and the load cell 12 are arranged in a state of being arrayed in the up-down direction U/L. In the example of FIG. 5, the second motor 13, the load cell 12 and the first motor 14 are arranged in a state of being arrayed in this order from the upper side U. That is, the second motor 13 is disposed more on the upper side U than the load cell 12, and the load cell 12 is disposed more on the upper side U than the first motor 14.

Herein, at least a member to be disposed on a lowermost side L among the first motor 14, the second motor 13 and the load cell 12 is disposed to be offset to the inside I of the main body 100 with respect to other members. In the example of FIG. 5, the first motor 14 is disposed to be offset to the inside I of the main body 100 with respect to the second motor 13 and the load cell 12.

In such a combination weighing apparatus 1, a height dimension of a component (internal component) of the driver 10, which is disposed more on the inside I than the opening 100A provided on the side surface of the main body 100, is larger than a height dimension of such an opening 100A. Therefore, the internal component is inserted into the opening 100A while inclining the driver 10 with respect to the opening 100A of the main body 100, whereby the driver 10 can be attached to the side surface of the main body 100.

That is, with the above-mentioned configuration, the height dimension of the opening 100A can be reduced, and accordingly, waterproofness thereof can be improved.

Moreover, with the above-mentioned configuration, the first motor 14 is not disposed immediately below the load cell 12, and therefore, the load cell 12 is less affected by heat generation of the first motor 14, and weighing accuracy can be improved.

According to the present embodiment, it is possible to makes it easy to join the top plate portion and the side surface to each other, and prevent the decrease of the machining accuracy due to the joining.

Although the present invention is explained in detail using the above-mentioned embodiments, it will be apparent to those skilled in the art that the present invention is not limited to the embodiments described herein. The present invention can be implemented as modifications and changes without departing from the spirit and scope of the present invention defined by the description of the claims. Accordingly, the description of the present specification is for the purpose of illustration and is not intended to limit the present invention in any way.

What is claimed is:

1. An article conveying apparatus comprising:
   a hopper that temporarily stores an article charged from an outside and discharges the article downstream;
   a driver that dives the hopper; and
   a main body to be attached with the driver, wherein
   the main body includes:
      a top plate that has a single plane in a horizontal direction; and
      a side surface that is a physically separate member from the top plate and is to be attached with the driver, and
   the side surface has:
      a first surface that stands up in a vertical direction and is to be connected to the top plate, wherein the first surface has an upper end and an outer surface extending downwardly from the upper end, and wherein the top plate is attached to and extends outwardly from the downwardly extending outer surface in the horizontal direction; and
      a second surface that is formed continuously with the first surface, is attached with the driver, and is inclined in a direction of going toward a center axis of the main body as going downward in the vertical direction.

2. The article conveying apparatus according to claim 1, wherein
   the article conveying apparatus is a combination weighing apparatus that receives and aggregates the articles by a chute having a circular shape, the articles being to be discharged from a plurality of hoppers arranged circularly above the chute.

3. The article conveying apparatus according to claim 1, wherein
   the hopper includes:
      a first hopper that temporarily stores the article charged from the outside and discharges the article downstream; and
      a second hopper that temporarily stores the article discharged from the first hopper and discharges the article downstream,
   the driver includes:
      a first motor that drives the first hopper;
      a second motor that drives the second hopper; and
      a load cell that senses a weight of the article stored in the second hopper,
   the first motor, the second motor, and the load cell are arranged in a state of alignment in an up-down direction, and
   among the first motor, the second motor, and the load cell, at least the member arranged on the lowermost side is arranged so as to be offset on the inner side of the main body relative to other members.

4. The article conveying apparatus according to claim 2, wherein
   the hopper includes:
      a first hopper that temporarily stores the article charged from the outside and discharges the article downstream; and
      a second hopper that temporarily stores the article discharged from the first hopper and discharges the article downstream,
   the driver includes:
      a first motor that drives the first hopper;
      a second motor that drives the second hopper; and
      a load cell that senses a weight of the article stored in the second hopper,
   the first motor, the second motor, and the load cell are arranged in a state of alignment in an up-down direction, and
   among the first motor, the second motor, and the load cell, at least the member arranged on the lowermost side is arranged so as to be offset on the inner side of the main body relative to other members.

5. The article conveying apparatus according to claim 1, wherein the top plate extends from the outer surface of the first surface in the horizontal direction toward the driver.

* * * * *